Dec. 29, 1964     W. H. MARTINDALE     3,162,946
TUBE CUTTER
Filed March 26, 1963

WILLIAM H. MARTINDALE
INVENTOR

BY / Norman S. Blodgett
ATTORNEY

United States Patent Office 3,162,946
Patented Dec. 29, 1964

3,162,946
TUBE CUTTER
William H. Martindale, Northboro, Mass., assignor to Standard Fittings Company, Framingham, Mass., a corporation of Massachusetts
Filed Mar. 26, 1963, Ser. No. 268,176
3 Claims. (Cl. 30—101)

This invention relates to a tube cutter, and more particularly, to apparatus arranged to provide for the cutting of tubing or pipe in the field.

There are many occasions in the plumbing and the electrical fields where the worker must cut his pipe or tubing very accurately on the job. The known tube cutters use cutting wheels to perform the cutting operation and, in order to cut deeper and deeper as the wheel progresses through the material, it is necessary to turn an adjusting screw, which is a very awkward operation. Furthermore, in some situations, as when cutting pipe close to a wall surface from which it protrudes, it is not only difficult to cut the tubing close to the surface but, by use of conventional tube cutters, the worker may skin his knuckles on protruding structures. Furthermore, where the tube which is to be cut is nested among a number of other tubes there often is not sufficient room to swing the conventional tube cutter. These and other difficulties experienced with the prior art devices have been obviated in a novel manner by the present invention.

It is, therefore, an outstanding object of the invention to provide a tube cutter which is adjustable for various sizes of tubing and which automatically feeds into the work.

Another object of this invention is the provision of a tube cutter which has the ability to operate close to a surface from which the tube protrudes.

A further object of the present invention is the provision of a tube cutter having a minimum radius of operation in the vicinity of the tube.

It is another object of the invention to provide a tube cutter which automatically operates to cut the tube squarely.

It is a further object of the invention to provide a tube cutter which is capable of cutting the tube in a restricted area.

A still further object of this invention is the provision of a tube cutter which is simple in design, inexpensive to manufacture, and which is capable of a long life of useful service with a minimum of difficulty with maintenance.

With these and other objects in view, as will be apparent to those skilled in the art, the invention resides in the combination of parts set forth in the specification and covered by the claims appended hereto.

Figure 1:
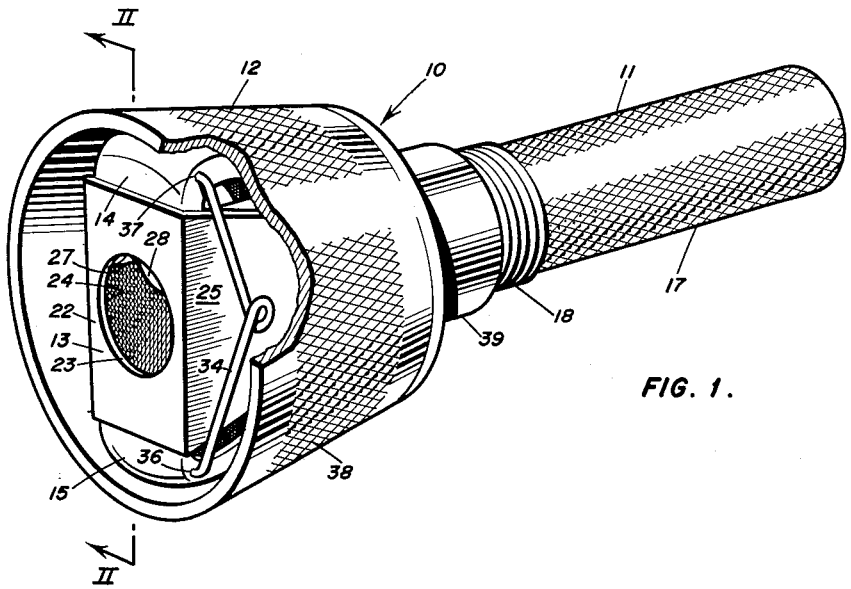
Figure 2:
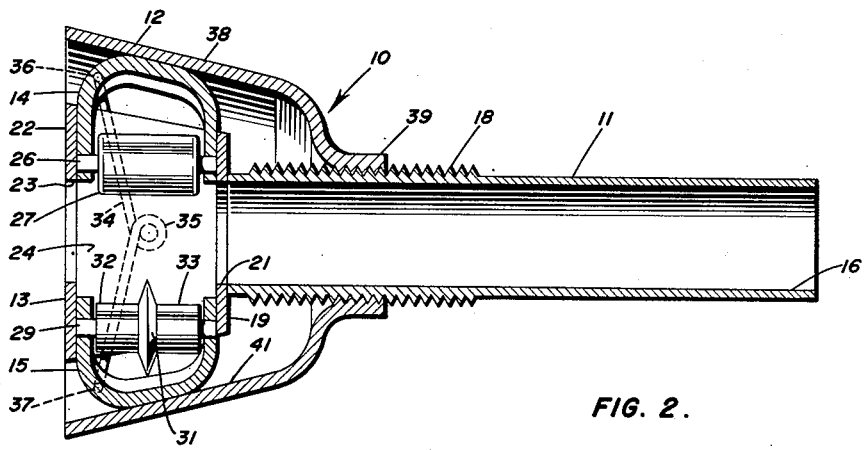

The character of the invention, however, may be best understood by reference to one of its structural forms as illustrated by the acompanying drawings in which:

FIG. 1 is a perspective view of a tube cutter embodying the principles of the present invention, and FIG. 2 is a sectional view of the invention taken on the line II—II of FIG. 1.

Referring first to FIG. 1, wherein are best shown the general features of the invention, the tube cutter, indicated generally by the reference numeral 10, is shown as consisting of a handle 11 and a shell 12. Mounted within the shell is a blade frame 13 and within the blade frame is mounted a roller yoke 14 and a cutter yoke 15.

Referring now to FIG. 2, it can be seen that the handle 11 is generally tubular and has an inner bore 16 which has a diameter at least that of the largest tube which is to be cut. The external surface is provided with a knurled portion 17 and a threaded portion 18. The blade assembly 13 consists of a plate 19 which is welded to the threaded end of the handle and which has a circular aperture 21 of the same size as the bore 16. The blade assembly 13 is also provided with another plate 22 having a circular aperture 23 which is the same size as the aperture 21. The plate 22 is held in parallel spaced relationship to the plate 19 by means of side plates 24 and 25. The blade assembly, therefore, consists of a generally rectangular box extending transversely of the axis of the handle 11 having open ends and being defined by the plates 19, 22, 24, and 25. The roller yoke 14 is a generally U-shaped member, as is evident in FIG. 2, and is provided with parallel, spaced pins 26 extending from one leg of the U-shaped yoke to the other and carrying rollers 27 and 28. The legs of the yoke 14 are provided with outer plane surfaces which are spaced an amount exactly equal to the distance between the plate 19 and the plate 22, so that the yoke 14 is capable of sliding within the tubular housing of the blade frame 13. In a similar way, the cutter yoke 15 is U-shaped and has a pin 29 extending between the legs and rotatably carrying a cutter blade 31. The cutter blade has a main hub 32 from the central portion of which extends a V-edged disk 33. Along either side plate 24 and 25 of the blade frame 13 it is provided with a wire spring 34 having a loop 35 in the central portion. One end of the spring is bent at a right angle to the plane of the side plate of the blade frame and inserted in an aperture 36 in the roller yoke 14. The other end is also bent at a right angle to the side plate 24 of the blade frame 13 and is inserted in an aperture 37 in the cutter yoke 15.

The shell 12 is of generally frusto-conical form and is provided on the exterior with a knurled portion 38. At the small end, it is provided with a hub 39 which is provided with internal threads which engage the threaded portion 18 of the handle 11. The interior of the shell is provided with a frusto-conical internal surface 41 which is engaged by the bights of the yokes 14 and 15.

The operation of the apparatus will now be readily understood in view of the above description. In order to cut a tube, the tube cutter 10 is advanced axially on the end of the tube so that the tube enters the aperture 23 in the plate 22 of the blade frame 13, passes between the rollers 27 and 28, on the one hand, and the cutter blade 31, on the other hand, passes through the aperture 21 in the plate 19, and then passes through the bore 16 of the handle 11. The tube cutter 10 is advanced along the tube until the disk 33 of the cutter blade 31 lies in the transverse plane where the cut is to be made. The operator then grasps the knurled portion 38 of the shell 12 and holds it in a fixed manner while he rotates the handle 11 by means of the knurled portion 17. The rotation of the handle 11 relative to the shell 12 will, because of the threads 18 engaging the threaded hub 39 of the shell, cause the handle to advance. The rotation is performed in such a way that the handle 11 will move to the right in FIG. 2 relative to the shell. In this way, the handle will carry the blade frame 13 to the right within the interior of the shell so that the bights of the yokes 14 and 15 will engage successively smaller portions of the frusto-conical surface 41. Eventually, this will cause the roller yoke 14 and the cutter yoke 15 to move inwardly within the blade frame 13. It will be guided in this movement by the inner surfaces of the plates 19 and 23, and by the side plates 24 and 25. Eventually, the rollers 27 and 28 and the sharp cutting edge of the disk 33 will contact the surface of the tube. At that time, the opeartor will continue to rotate the handle 11 but will permit the shell 12 to rotate with the handle. By producing a slight friction on the knurled portion 38 of the shell, the shell can be moved at a slightly slower speed than the handle 11, so that the handle will continue to advance to the right slightly relative to the shell to force the cutting disk 33 into the surface of the tube. As the handle 11 is rotated, of course, the cutter assembly 13 will also rotate so that the cutter disk 33 will bite into the tube and form a groove completely around the tube. This groove will become deeper and deeper due to the fact that the shell rotation is being slightly inhibited by the slight friction produced by the hand of the operator. Eventually, the tube, of course, will be severed.

It can be seen that the present invention permits the operator to work very closely to a wall or ceiling surface from which a tube protrudes and to cut the tube a short distance from the surface. At the same time, because of the construction, it is guaranteed that the cut will be exactly at a right angle to the axis of the pipe or, in other words, the end of the pipe or tube will be square.

It will be noted that the springs 34 and 35 operate on the yokes 14 and 15 to force them outwardly of the enclosure presented by the plates 19, 22, 24, and 25, so that, if the handle 19 is rotated to advance the threads to the left in FIG. 2, the yokes will always be pressed against the surface 41. This is true, despite the fact that as the rotation progresses, the cutter assembly 13 will advance closer to the opening of the shell and the yokes will occupy successively larger portions of the surface 41.

Since the rotation of the cutter takes place by means of rotation of the end of the handle 11, it can be seen that the tube cutter 10 can be operated in a very restricted space, particularly in one in which the pipe to be cut is surrounded by other pipe and in which the long handled tube cutters of the prior art would not have room to swing. It is interesting to note that the tube cutter, according to the present invention, will be capable of absorbing a considerable amount of abuse, since the operating mechanisms are enclosed within the shell 12, and the only parts which are exposed are the handle 11 and the shell 12 which are of very rugged construction.

It is obvious that minor changes may be made in the form and construction of the invention without departing from the material spirit thereof. It is not, however, desired to confine the invention to the exact from herein shown and described, but it is desired to include all such as properly come within the scope claimed.

The invention having been thus described, what is claimed as new and desired to secure by Letters Patent is:
1. A tube cutter, comprising
   (a) an elongated handle having a longitudinal bore capable of receiving the tube to be cut,
   (b) a shell having a threaded bore which is threadedly engaged with the handle for movement therealong and having a conical inner surface coaxial of the threaded bore, the said inner surface formed by a counterbore opening away from the said threaded bore and having its larger end away from the threaded bore, and
   (c) a cutter assembly mounted in the shell and engaging the conical inner surface for movement transversely of the axis of the handle bore as the shell is moved along the handle.
2. A tube cutter, comprising
   (a) an elongated handle having a longitudinal bore capable of receiving the tube to be cut, and having threads formed on one end,
   (b) a shell threadedly engaged with the handle and having a conical inner surface, and
   (c) a cutter assembly consisting of slidable roller and cutter yokes mounted in the shell and engaging the conical inner surface for movement transversely of the axis of the handle bore as the shell is threaded along the handle.
3. A tube cutter, comprising
   (a) an elongated tubular handle having an inner diameter larger than the outer diameter of the largest tube to be cut,
   (b) a shell having a threaded bore which is threadedly engaged with the handle for movement therealong and having a conical inner surface coaxial of the threaded bore, the said inner surface formed by a counterbore opening away from the said threaded bore and having its larger end away from the threaded bore, and
   (c) a cutter assembly mounted in the shell and engaging the conical inner surface for movement transversely of the axis of the handle bore as the shell is moved along the handle.

References Cited in the file of this patent
UNITED STATES PATENTS

| | | |
|---|---|---|
| 500,443 | Tyler | June 27, 1893 |
| 595,727 | Oefinger | Dec. 21, 1897 |
| 756,760 | Wolf | Apr. 5, 1904 |
| 1,085,967 | Brown | Feb. 3, 1914 |